(12) United States Patent
Sirlin

(10) Patent No.: US 11,808,404 B1
(45) Date of Patent: Nov. 7, 2023

(54) LEVERAGING CLAMP DEVICE

(71) Applicant: Arnold Sirlin, Tustin, CA (US)

(72) Inventor: Arnold Sirlin, Tustin, CA (US)

( * ) Notice: Subject to any disclaimer, the term of this patent is extended or adjusted under 35 U.S.C. 154(b) by 0 days.

(21) Appl. No.: 18/302,311

(22) Filed: Apr. 18, 2023

(51) Int. Cl.
  *F16M 13/02* (2006.01)
  *F16B 2/12* (2006.01)
  *F16B 2/18* (2006.01)

(52) U.S. Cl.
  CPC ............ *F16M 13/022* (2013.01); *F16B 2/12* (2013.01); *F16B 2/185* (2013.01)

(58) Field of Classification Search
  CPC .......... F16M 13/022; F16B 2/12; F16B 2/185
  USPC ........ 248/229.12, 206.1, 689, 229.1, 229.22, 248/231.41, 316.1
  See application file for complete search history.

(56) References Cited

U.S. PATENT DOCUMENTS

| | | | | |
|---|---|---|---|---|
| 9,791,101 B1* | 10/2017 | Frankel | ................... | A47D 13/04 |
| 10,041,516 B2* | 8/2018 | Swan | .................. | F16M 13/022 |
| 10,151,425 B1* | 12/2018 | Bileth | ..................... | B25H 3/06 |
| 10,253,926 B1* | 4/2019 | Fan | ......................... | F21V 21/096 |
| 10,539,165 B2* | 1/2020 | Graham | .................. | F16B 2/185 |
| 2018/0080605 A1* | 3/2018 | Janway | ................ | F16M 13/022 |
| 2018/0100618 A1* | 4/2018 | Ho | ....................... | F16M 13/022 |

* cited by examiner

Primary Examiner — Todd M Epps
(74) Attorney, Agent, or Firm — Kilpatrick Townsend & Stockton LLP; Kenneth Shurtz, Esq.

(57) ABSTRACT

A clamping device having a pair of jaws that mounts on to an object and utilizes a fulcrum and leveraging mechanism to provide a combination of leveraged force and compression force to improve clamping and withstand vibration. This configuration provides enhanced gripping action at the open end of the jaws, which is especially advantageous when mounted near the edge of an object, such as a shelf. The clamping device can be low profile, compact and lightweight. The interior sides of the parallel jaws of the clamping device can be padded to prevent damage. This clamping device enables fastening to an accessory support for supporting the weight of items that extend beyond a center of gravity of the device. These items can include audio or video cables extending beyond shelves of on an audio equipment rack, or lighting and grip equipment, or can be used in any industry or endeavor.

30 Claims, 10 Drawing Sheets

LEVERAGING CLAMP DEVICE

BACKGROUND OF THE INVENTION

The present invention relates generally to clamping devices for clamping onto an object, and particularly to clamping devices for supporting accessory equipment.

High end audio and video systems utilize relatively large transmission cables, which are bulky and heavy, such that the cables can be difficult to manage and can undesirably exert forces on connecting equipment, such as receivers, signal processors, etc. Examples of such high-end audio and video cables include those manufactured and sold by Purist Audio Design®, Synergistic Research®, Audioquest® and Dynamic Design AV®.

Notably, when an audio or video system is playing, the speakers create vibrations that travel throughout the room via conduction by the air, floor, walls, and ceiling. These vibrations travel up through the cables and the audio/video equipment rack where the vibrations have a deleterious effect on the video and sound quality by shaking the audio/video components themselves.

To counter-act this deleterious effect, many owners of high-end audio systems install after-market vibration controls devices or isolator devices placed under the individual audio/video components. These vibration control devices function as footers for the audio/video components, relegating the stock feet to be inactive. These vibration control devices are very sensitive and allow for very small movements to manage the vibration. Heavy or stiff audio/video cables that are attached to the audio/video equipment restrict movement of the equipment which in turn negatively impacts the performance of the vibration control devices. Examples of vibration control devices can include those manufactured or sold by IsoAcoustics®, Critical Mass Systems®, Stillpoints®, Symposium Acoustics® (Rollerblocks®) and Townshend Audio®. The downside of many conventional vibration control devices are that these devices are excessively large, robust and heavy. The result is that such devices are cumbersome to use, cannot be readily mounted on standard shelving and are not amenable for use with equipment that is not itself large or heavy. Thus, there is a need for improved vibration control for audio/visual equipment.

Typically, behind an audio/video equipment rack there is a jumble of cables. This jumble can contain a host of electrical artifacts such as electromagnetic induction (EMI) and radio frequency induction (RFI). These electrical artifacts negatively affect the picture and/or sound quality of the audio/video system. Thus, there is a need for improved cable management for audio/video systems.

Additionally, in motion picture and television production, lighting and grip equipment is routinely clamped to structures on a film set. Motion picture production often requires supporting and positioning of a wide array of equipment, including cameras, microphones, lighting and various other specialized equipment. This equipment can be mounted on stationary supports, as well as booms and other dynamic supports for filming moving vehicles or action sequences. Accordingly, motion picture mounting equipment may be required to support a wide range of equipment at varying angles and positions while subjected to considerable dynamic forces. Many different types of existing clamps are used to mount this film equipment. This equipment can be quite heavy and cumbersome and exert forces on the clamps that lead to loosening of the clamp over time. Thus, there is a need for improved clamping devices that maintain sufficient clamping force while supporting a load.

There is a need for improved clamping devices that overcome the various challenges noted above in these seemingly disparate applications. It would be advantageous if such clamping devices were able to support relatively heavy cables and equipment while maintaining clamping force. It would be further desired that such clamping devices be resistant to vibrations and facilitate cable management for audio and video cables.

SUMMARY OF THE INVENTION

The invention pertains to clamping devices, in particular, clamping devices designed to maintain a clamping force while supporting a load and while withstanding vibrations. By supporting the weight of audio/visual cables, with an accessory support attached to the improved clamping device, the equipment attached to such cables can move more freely whereby the vibration control devices can function more effectively. Further, the improved clamping device provides lasting and reliable support of cables and equipment despite any vibrations, thereby allowing for improved cable management.

In one aspect, the invention pertains to a clamping device that includes: a pair of jaws that are spaced apart so as to clamp onto an object disposed between inner facing sides of the pair of jaws disposed; a fulcrum extending between the pair of jaws along a mid-portion thereof; and a leveraging mechanism extending between the pair of jaws between the mid-portion and an outer side facing away from the object when clamped. In some embodiments, the pair of jaws includes a stationary jaw and a slidable jaw that can slide relative the stationary jaw to accommodate objects of differing size and thickness. In some embodiments, the clamping device further includes an adjustable resistance plate disposed atop one jaw of the pair of jaws, the plate being adjustable so as to increase a clamping force of the adjacent jaw along the inner facing side engaged on the clamped object. In some embodiments, the clamping device further includes one or more support coupling features for releasably coupling a support configured to support an accessory, such as audio or video cables and/or other equipment. In other embodiments, the clamp is not required to include any support coupling feature and can utilize the pair of jaws for any clamping application, such as furniture clamping.

The fulcrum can include one or more shafts extending through corresponding holes in each of the pair of jaws, typically along a mid-portion of the jaws. In some embodiments, the fulcrum includes a pair of shafts extending through a pair of corresponding holes in each of the jaws. In some embodiments, each of the shafts of the fulcrum include a fastener engaged along an exterior of one of the pair of jaws. In some embodiments, each of the shafts of the fulcrum can include a threaded bolt with a female fastener, such as a wingnut. In some embodiments, each of the shafts is a threaded shaft and the fastener can be any suitable fastener the position of which can be adjusted on the shaft. In other embodiments, the shaft(s) can include grooves or notches that allow incremental adjustment of any suitable fastener thereon.

The leveraging mechanism can include one or more shafts extending through corresponding holes in each of the pair of jaws, typically between the mid-portion and the outer facing end of the jaws. In some embodiments, the leveraging mechanism includes a pair of shafts extending through a pair of corresponding holes in each of the jaws. In some embodiments, each of the shafts of the leveraging mechanism includes a pair of fasteners engaged along the interiors of the jaws so that adjustment of the fasteners in opposite directions leverage one jaw at the outer facing side to pivot the jaw along the fulcrum and increase the clamping force at the inner facing side. In some embodiments, each of the shafts includes a threaded bolt and a pair of fasteners, typically female fasteners, such as a nuts. In some embodiments, each of the shafts is a threaded shaft and the fastener can be any suitable fastener the position of which can be adjusted on the shaft. In other embodiments, the shaft(s) can include grooves or notches that allow incremental adjustment of any suitable fastener thereon.

The resistance plate can include a planar plate disposed atop one jaw and an adjustment mechanism that, when adjusted, applies a force along the adjacent jaw to increase a clamping force between the jaw along the inner facing, open mouth end of the clamp. In some embodiments, the adjustment mechanism is one or more male fasteners extending through one or more corresponding holes in the resistance plate that directly engage the jaw when adjusted. The male fastener can be a thumbscrew, hex headed screws, or any suitable fastener. In some embodiments, the resistance plate is a separate plate in tandem with the slidable jaw, while in other embodiments, the resistance plate and slidable jaw are integrated in a single component.

In another aspect, the clamping device can include a support coupling feature configured for coupling to an accessory support. In some embodiments, the coupling features is one or more openings or passages extending through at least one jaw. In some embodiments, the coupling features include multiple openings at differing orientations so that equipment can be coupled to two coupling features for improved stability or coupled at differing orientations for a single position of the clamping device. In some embodiments, the passages are circular holes. In other embodiments, the passages are square or rectangular, or any suitable non-circular shape. In some embodiments, the coupling feature further includes a lock mechanism for securing a shaft of the accessory support therein. The lock mechanism can include a male fastener extending through a threaded hole intersecting the passageway or any suitable lock or latch.

A further understanding of the nature and advantages of the present invention may be realized by reference to the remaining portions of the specification and the drawings.

DETAILED DESCRIPTION

Figure 1:
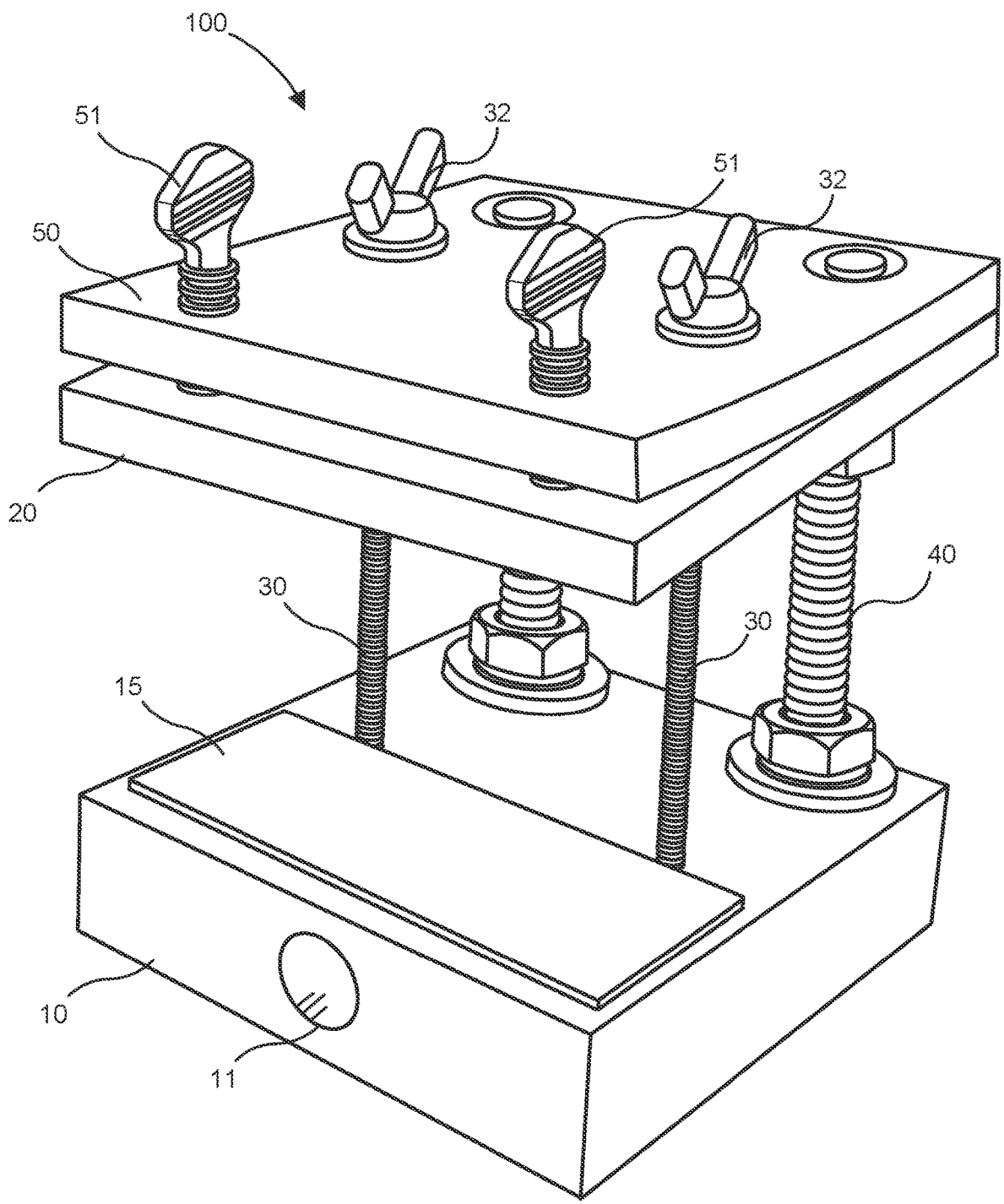
FIGS. 1-4 show a clamping device in accordance with some embodiments.

The present invention relates generally to clamping devices for clamping onto an object for supporting equipment that maintains clamping force while withstanding vibration. The clamping mechanism is particularly useful for clamping onto support infrastructure, such as shelves, racks, scaffolding, pipes, to securely support components, such as audio or visual cables, or various other items.

As described above, conventional clamp mechanisms that support equipment, such as audio and video cables, suffer from various drawbacks. These drawbacks include a tendency to loosen over time when exposed to vibrations, limited versatility in orientation of equipment being supported, excessive size, and limited compression force applied by the clamp. For example, the Cardellini clamp, which is ubiquitous in the motion picture industry, has a limited ability to fasten accessories as its design does not allow the clamp to be located in narrow spaces and it provides limited positive compression force on the open mouth end of the clamp as compared to the improved clamp design described herein. Regarding conventional cable management systems, many such systems are intended for large scale commercial use, for example in the telecommunication industry, and are therefore designed to secure and organize a large number of cables, therefore, such devices tend to be excessively large in size, as compared to the clamp design described herein, and are ill suited for most consumer installations.

In contrast, the clamping device design described herein overcomes the above noted drawbacks, by providing improved clamping along the open mouth end of the clamp through combining compressive and leveraged forces. Testing indicated that this combination of leveraged and compressive forces maximizes clamping forces and provides superior clamping stability and resistance to vibration than conventional clamping devices. Further, the design can be used for large-scale applications or can be made more compactly of a smaller scale and size to support and organize a limited number of cables so as to be suitable to support and manage high fidelity audio or video cables in a home installation. Advantageously, the clamping device described herein can meet any of the following objectives: a) a clamp that will clamp to objects of various shapes, sizes, dimensions; b) a clamp that will grip securely in all directions, axis and angles; c) a clamp that will not damage the surface of the object that it is clamped to; d) a clamp that can be readily attached and detached from an object; e) a clamp that is compact, light-weight, low profile; g) a clamp that that enables the attaching of an accessory or accessories for uses in assorted industries; h) a clamp that attaches securely near the edge of a planar surface; i) a clamp that will fit tight spaces; k) a clamp that can be disassembled and its components rearranged to suit specific needs; and l) a clamp where the space between the jaws can be adjusted, for example by interchanging the size and length of threaded shafts that holds the clamp together and provides clamping forces. It is appreciated that embodiments of the clamping device can provide any of the above features or any combination thereof. The above noted features can be further understood by referring to embodiments of the clamping devices described below.

In a first aspect, the clamping device provides improved clamping of an object between opposing jaws by utilizing a combination of leveraged forces and compression forces. In some embodiments, the clamping device includes a pair of jaws at least one of which can pivot about a fulcrum when a force is applied by a leveraging mechanism toward the outer facing end of the device. In some embodiments, the fulcrum is defined by one or more shafts along or near a mid-portion of the jaw, and the leveraging mechanism is defined by one more shafts between the mid-portion and the outer facing end of the jaws. In some embodiments, the pair of jaws includes a stationary jaw and a slidable jaw. The clamping device can further include one or more male and female fasteners for facilitating positioning of the slidable jaw on the shafts and application of leveraged and compression forces to improve clamping.

In another aspect, the clamping device can include a resistance plate, a slideable jaw, a stationary jaw, one or more fulcrum threaded shafts, one or more leveraging threaded shafts, one or more threaded male fasteners, and one or more threaded female fasteners. The male fasteners can include a thumbscrew, a threaded shaft, or any suitable fasteners. The female fasteners can include a bolt, wingnut or any suitable fastener. The assembly of these components can be further understood by referring to the embodiments in FIGS. 1-9.

FIG. 1 shows an exemplary clamping device 100 having a stationary jaw 10, a slidable jaw 20, a fulcrum 30, a leveraging mechanism 40 and a resistance plate 50, the jaws being configured for securely clamping onto an object, such as a shelf or rack. The resistance plate 50 and slidable jaw 20 travel in a tandem arrangement sliding along the shafts of the fulcrum 30 and leveraging mechanism 40 so that the jaws 10, 20 can be separated to receive the object therebetween and the slidable jaw and resistance plate in tandem can be slid toward the stationary jaw and secured, thereby holding the object between the jaws. In this embodiment, each of the shafts of the fulcrum and the leveraging mechanism is a threaded shaft (e.g. a bolt) that extends through corresponding holes in the jaws and resistance plate. On one end of the threaded shaft of the fulcrum, a female threaded fastener 32 (e.g. nut, wingnut) can be tightened on the tandem arrangement of the resistance plate 50 and slidable jaw 20 to facilitate clamping of the jaws on the object and also to serve as a pivot point of the slidable jaw when an applied force is leveraged by the leveraging mechanism. On the threaded shaft of the leveraging mechanism, adjustment, a female threaded fastener urges the inner side of the jaw 20 causing the open end mouth between jaws to apply or increase clamping pressure upon the object by the tandem slidable jaw and resistance place.

The resistance plate 50 includes one or more internally female threaded holes through which one or more male fasteners 51 are located, the holes being located between the mid-portion and open end mouth of the clamping device. The male fasteners 51 can be a thumbscrew or any suitable fastener. When tightened, the male threaded fasteners act as a biasing member urging apart the resistance plate 50 and the slideable jaw 20 thereby engaging jaw and applying additional clamping pressure upon object by the slideable jaw 20.

Figure 2:
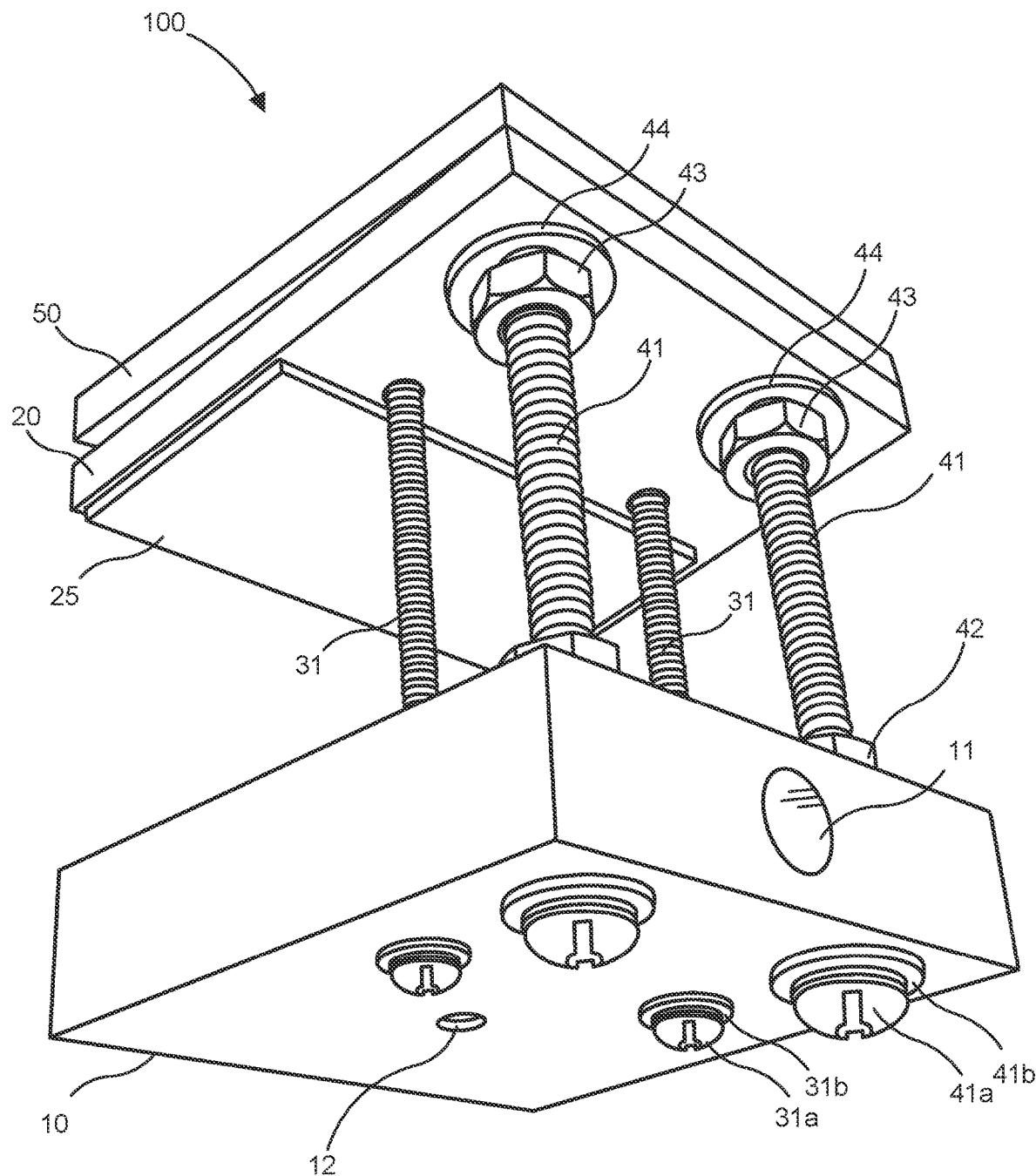
Figure 3:
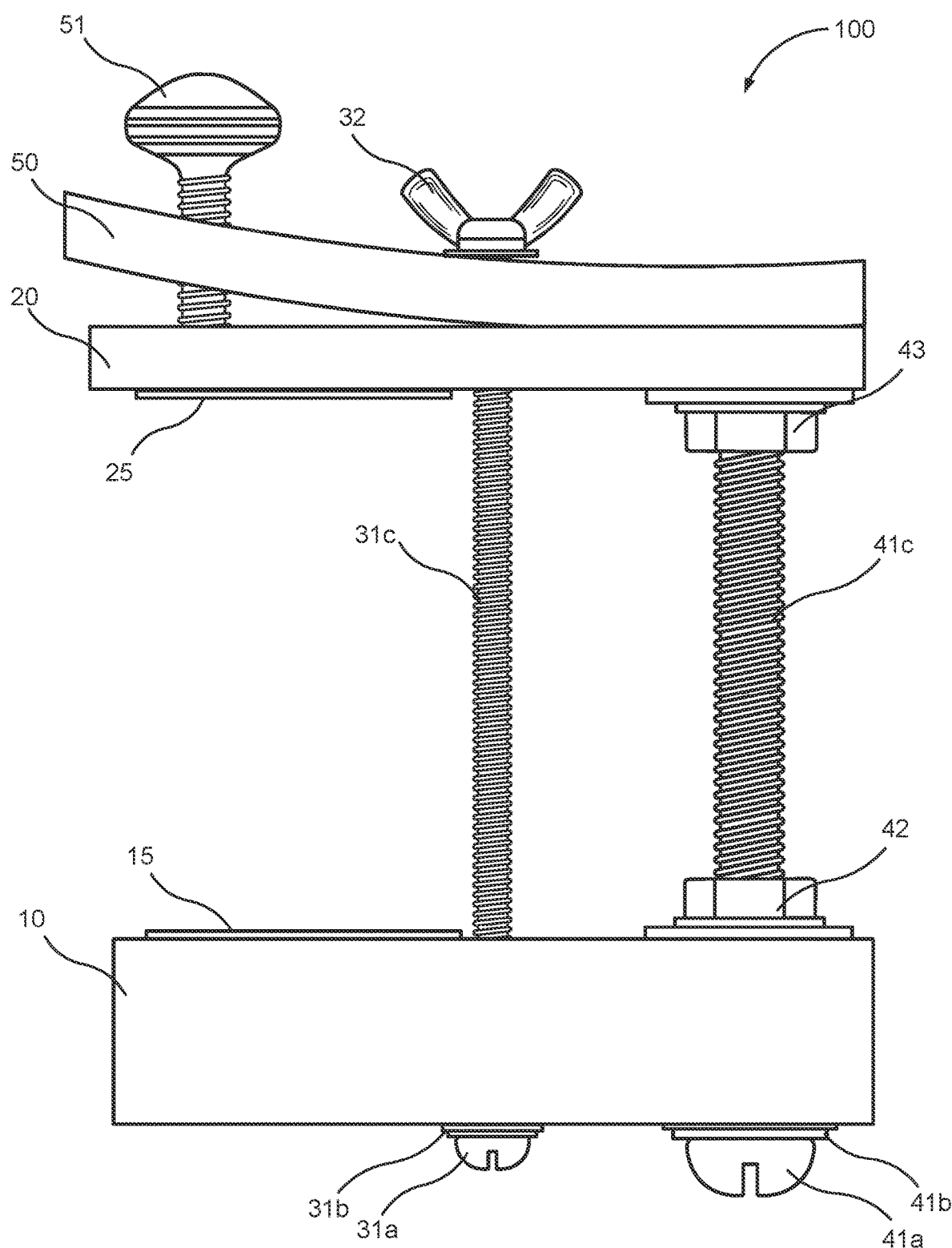
Figure 4:
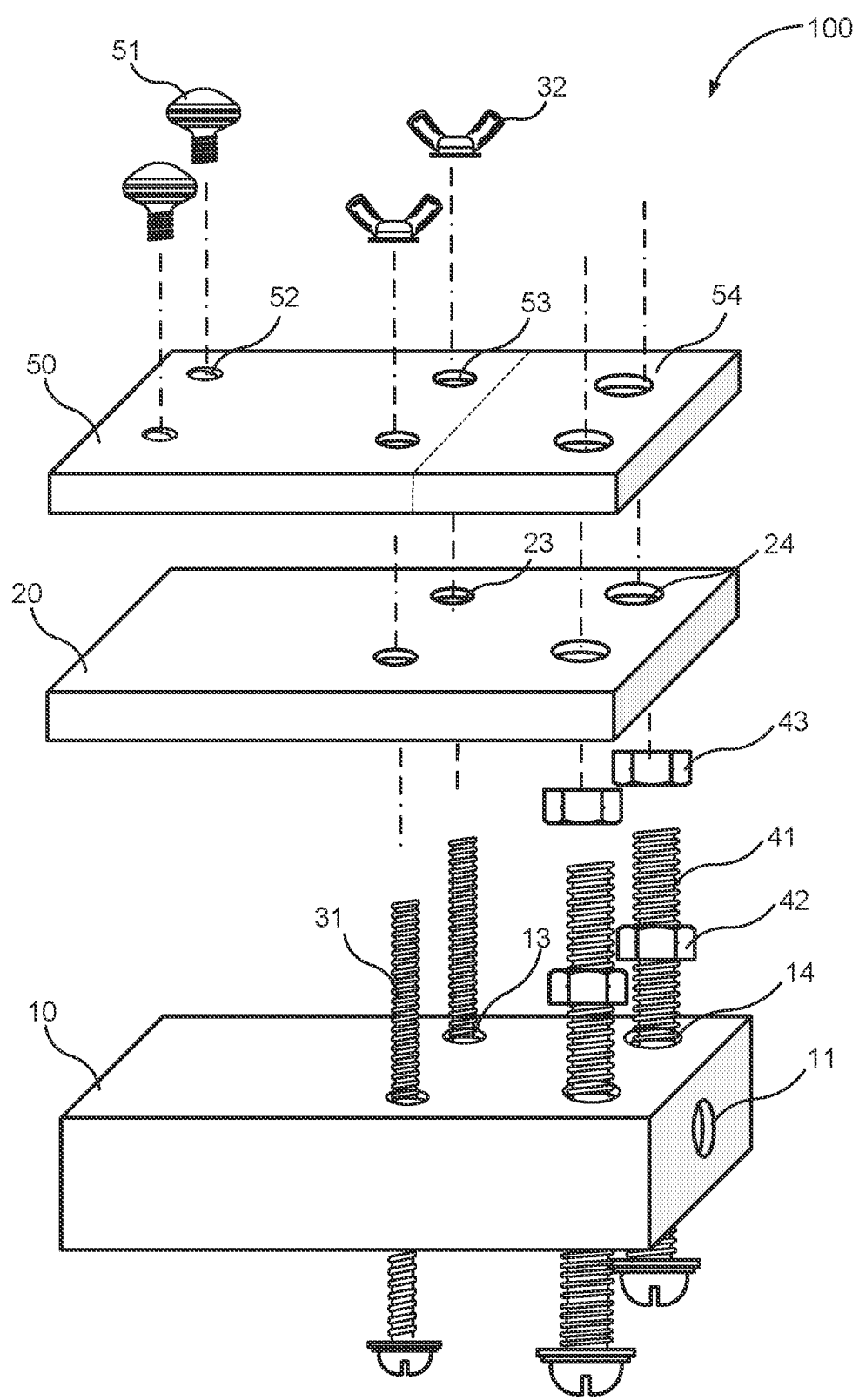

Additional details can be understood by referring to FIGS. 1-4, which show the clamping device from an front top perspective in FIG. 1, a rear underside perspective in FIG. 2, a side perspective in FIG. 3, and an exploded view in FIG. 4. In this embodiment, clamping device 100 includes the pair of jaws 10, 20, which are planar plates, being configured to clamp securely onto a planar object, such as a shelf, to provide a secure mounting thereto. The pair of jaws includes the stationary jaw 10 and slidable jaw 20, which are connected by the fulcrum 30, defined by two shafts and associated fasteners, and the leveraging mechanism 40, defined by two shafts and associated fasteners. As shown, adjustment of the fulcrum mechanism 40 allows the slidable jaw 20 to pivot about the fulcrum, thereby increasing compression force between jaws 10, 20. Additionally, resistance plate 50 can be adjusted by one or more fasteners 32 to further increase the compressive force along the open end of the jaws. Advantageously, this design provides a combination of leveraging a force by the fulcrum mechanism and increased compressive force along the open ends of the jaws by the spring force of the resistance plate, thereby allowing the clamp to maintain clamping while supporting a load and while subjected to periodic vibrations. Additional details of each component of the clamp device in FIGS. 1-4 are described below.

Stationary jaw 10 is defined as a substantially planar member having a flat inner face suitable for engaging one side of a planar object, such as a shelf or rack. The inner face can further include a pad 15 to inhibit damage to the object being clamped. Stationary jaw can include one or more openings for passage of one or more fulcrum shafts and leveraging shafts. In this embodiment, the stationary jaw 10 includes a pair of openings 13 at or near a mid-portion of the jaw for passage of the pair of shafts 31 of fulcrum 30, as can be seen in FIG. 4 (which shows an exploded view of the major components). Stationary jaw further includes a pair of openings 14 between the mid-portion and the outer end for passage of the pair of leveraging shafts 41. The stationary jaw can be made of metal, wood, plastic, or any suitable material. As shown, the stationary jaw 10 is rectangular in shape, although it is appreciated that it could be defined in various other shapes (e.g. square, circular, oval, etc.) and still retain its operative function. Additionally, while the inner face of the clamp is shown as flat or planar, it is appreciated that the inner face could also be non-planar and include a contour (e.g. inward curved or angled portions) so as to clamp onto a non-planar object, such as a pipe of a stand or scaffold. In some embodiments, the stationary jaw has a suitable dimension that enables fastening to itself an accessory or accessories. For example, in this embodiment, stationary jaw 10 includes one or more coupling features 11 to facilitate coupling with an accessory support. Accordingly, the stationary jaw is thicker than the slideable jaw to accommodate the coupling feature. The coupling feature can be one or more holes for receiving a corresponding member (e.g. rod, baby pin, etc.) of the accessor support (see support 500 in FIG. 10). In this embodiment, the coupling feature is a through hole 11, as shown in FIGS. 1-2, which receives a portion of the support and is secured by a fastener extending through a threaded lock hole 12 intersecting the coupling feature 11.

Slidable jaw 20 is similarly defined as a substantially planar rectangular member having an inner face suitable for engaging the opposite side of the planar object being clamped. The slidable jaw can slide along the shafts of the fulcrum 30 and leveraging mechanism 40 so that a distance between the pair of jaws can be adjusted to accommodate objects of differing size and thickness. The inner face can further include a pad 25 to inhibit damage to the object being clamped, as shown in FIG. 2. Slidable jaw includes one or more openings for passage of the one or more shafts of the fulcrum and leveraging mechanism. In this embodiment, the slidable jaw 20 includes a pair of openings 23 along or near a mid-portion for passage of the pair of shafts 31 of the fulcrum 30 and a pair of openings 24 for passage of the pair of shafts 41 of the leveraging mechanism 40, as shown in FIG. 4. The slidable jaw can be made of metal, wood, plastic, or any suitable material. As shown, the slidable jaw 10 is rectangular in shape, although it is appreciated that it could be defined in various other shapes (e.g. square, circular, oval, etc.) and still retain its operative function. While the slidable jaw is of the same general shape as the stationary jaw, it is appreciated that the slidable jaw could be of the same or a differing shape. Additionally, while the inner face of the clamp is shown as flat, planar, it is appreciated that the inner face could also be curved or angled so as to clamp onto a non-planar object, such as a pipe.

Resistance plate 50 is attached to the outer side of the slidable jaw 20. The resistance plate can be attached to the slidable jaw by one or more fasteners, typically at or near the mid-portion of the slidable jaw, as shown in FIGS. 1-3. Resistance plate can include one or more openings for passage of the shafts of the fulcrum and leveraging mechanism. In this embodiment, resistance plate 50 includes a pair of openings 53 for passage of the pair of shafts of the fulcrum and a pair of openings 54 for passage of the pair of shafts, as shown in FIG. 4. Resistance plate further includes one or more holes with one or more male fasteners along the inner, open mouth end of the clamp so that, when adjusted, the fasteners force the end of the resistance plate away from the slidable jaw, which increases the clamping force along the open end of the clamping device. This is achieved by a pair of threaded holes 52 in the resistance plate along the inner, open mouth end of the clamping device that receive one a pair of male fasteners 51 (e.g. thumbscrews), that when screwed through the holes, engage the slidable jaw, thereby forcing the inner end of the resistance plate away from the jaw to exert an inwardly directed force on the slidable jaw. In some embodiments, this force can be determined by the spring force of the resistance plate and amount of deflection. Thus, the resistance plate and fastener design can be determined by the amount of additional clamping force desired. In this embodiment, the resistance plate and the slideable jaw are two separate pieces, however, in other embodiments, these components can be integrated, for example, one piece that is split on one end. While the resistance plate is shown in this embodiment as being generally the same size, shape and thickness as the slidable jaw, it is appreciated that the resistance plate can be of a different size, shape and/or thickness as the jaw. For example, the resistance plate need not extend over the leveraging mechanism and could end adjacent to its attachment to the fulcrum shafts (along dashed line in FIG. 4).

As shown in FIGS. 1-4, the shafts of the fulcrum and leveraging mechanism can be threaded bolts 31, 41, each having a head portion and a threaded portion along its length. In this design, the bolts are inserted so that the head is disposed on the outer side of the stationary jaw 10 and the threaded portion extends through the openings in each for engagement with one or more female threaded fasteners. It is appreciated that the heads of the bolts may also reside in a recess or countersink within the jaws or within a custom molded jaw to improve aesthetics. Optionally, a washer can be used between the head and the jaw and/or between the female fasteners and the shafts. As shown in FIG. 2, the fulcrum shafts are threaded bolts 31 that extend between the jaws with the head 31*a* of the bolts 31 disposed along the outside of stationary jaw, with a washer 31*b* disposed in between. Similarly, the leveraging mechanism shafts are threaded bolts 31 that extend between the jaws with the head 41*a* of the bolts 41 disposed outside the stationary jaw, with a washer 41*b* disposed in between. The fulcrum also includes a female fastener 32 (e.g. wingnut or nut) disposed on the opposite side, outside the tandem slidable jaw and resistance plate. The leveraging mechanism further includes a pair of female fasteners 42, 43 (e.g. nut) on each bolt 41 along the inside of each of the stationary jaw and slidable jaw, as shown in FIG. 2. These female fasteners can be adjusted to force the jaws apart along the closed end of the clamping device, thereby leveraging the slidable jaw via the fulcrum to increase the clamping force at the open mouth end of the clamping device. In this embodiment, the leveraging mechanism further includes washers 44 disposed between the female fasteners 42, 43 and the respective jaws. As shown, the female fasteners 42, 43 (e.g. nuts) are acting as biasing member that push the jaws apart, which provides the leveraging action via the fulcrum shafts to produce the leveraged force.

While the depicted embodiment in FIG. 1 shows a fulcrum and leveraging mechanism each defined by two shafts with two female fasteners and a resistance plate with two male fasteners, it is appreciated that the number of shafts and fasteners could vary as determined by the amount of pressure required to securely mount the clamping device to the object. For example, a relatively small clamp supporting a relatively light load could utilize a fulcrum and leveraging mechanism each defined by a single shaft, while larger clamps for supporting larger loads could utilize two or even more shafts for each. It is appreciated that the various other aspects could vary between embodiments as well. The positioning of the fulcrum shafts, leveraging shafts, male threaded fasteners, and female threaded fasteners can also vary per the embodiment of the respective clamping device. The lengths, diameter and sizes of the fulcrum shafts, leveraging shafts, male threaded fasteners, and female threaded fasteners can vary per the embodiment of the clamping device. The dimensions of the resistance plate, slideable jaw and stationary jaw can vary as per the embodiment of the clamping device. Accordingly, the threaded shafts, the male threaded fasteners, the female threaded fasteners provide a means to attach parts together as well as to create clamping means both directly and indirectly.

It is appreciated that the above noted attributes can be determined based on the required capabilities of the respective clamping device for a particular application. For example, the compression forces and leveraged forces are determined by the location of the leveraging shafts, the male threaded fasteners, the female threaded fasteners and the clamping device design, which determine the required amount of force needed to be applied to the respective shafts. For example, in some embodiments, the fulcrum is located centrally, while in other embodiments, the fulcrum is located off-center. In some embodiments, the fulcrum is slightly off-center favoring the inner, open mouth end of the clamp to increase leveraging force to produce more compression force. In some embodiments, the fulcrum is located at or near the mid-point between the outer end and the inner end of jaws. It is noted that, although the drawings depict an upright orientation of the clamping device, the clamping device could be mounted in any orientation (e.g. sideways, reverse, angled) depending on the requirements of a particular application. While in the embodiments shown, the jaws are generally planar and rectangular in shape, the jaws can be defined in any suitable shape (e.g. rectangular, square, H-shaped, X-shaped, Y-shaped, reverse Y-shaped, etc.). Further, the interior contact surfaces of the jaws need not be planar, but could be curved, angled, notched, etc, as needed for clamping a particular object. Additionally, the jaws could be of the same shape or differing shapes, as desired.

In another aspect, the invention pertains a clamping device or mount that enables the fastening of an accessory support to itself to support cables and/or create separation of cables from each other to mitigate the effect of the electrical artifacts noted above. Accordingly, the clamping device can include one or more coupling features 11. In this embodiment, coupling feature 11 is a hole that extends widthwise through the stationary jaw 10. A support mechanism for supporting cables or equipment can include a rod that is inserted into the coupling feature 11 and secured. In this embodiment, the rod of the support mechanism can be secured within the hole defining the coupling feature 11 by a male fastener screwed into a threaded hole 12 that intersects the hole (see FIG. 2). It is appreciated that coupling feature 11 could instead utilize various other locking or latch features to secure the support (e.g. spring-loaded ball bearings, friction fit, etc.) and can be especially configured according to any interface standard (e.g. ⅝" round hole) so as to receive a standard baby pin. While the coupling feature is depicted as a circular hole in the embodiment of FIG. 1, the coupling feature can be any suitable shape (e.g. square, rectangular, polygonal, star, regular or irregular shape). In some embodiments, the coupling feature can be a non-circular shape or can include multiple passages, as shown for example in the embodiment of FIG. 6 discussed further below.

The clamping device described herein is particularly useful for mounting equipment for film and television production, for example in helping to rig lighting and grip equipment on film sets. However, it is appreciated that clamping device in accordance with the inventive concepts herein are not limited to audio/video systems. It may be utilized in any industry or endeavor, including merely clamping items together for any purpose. Further, this clamp enables fastening to itself any accessory or accessories that are pertinent for any industry or endeavor.

Figure 5:
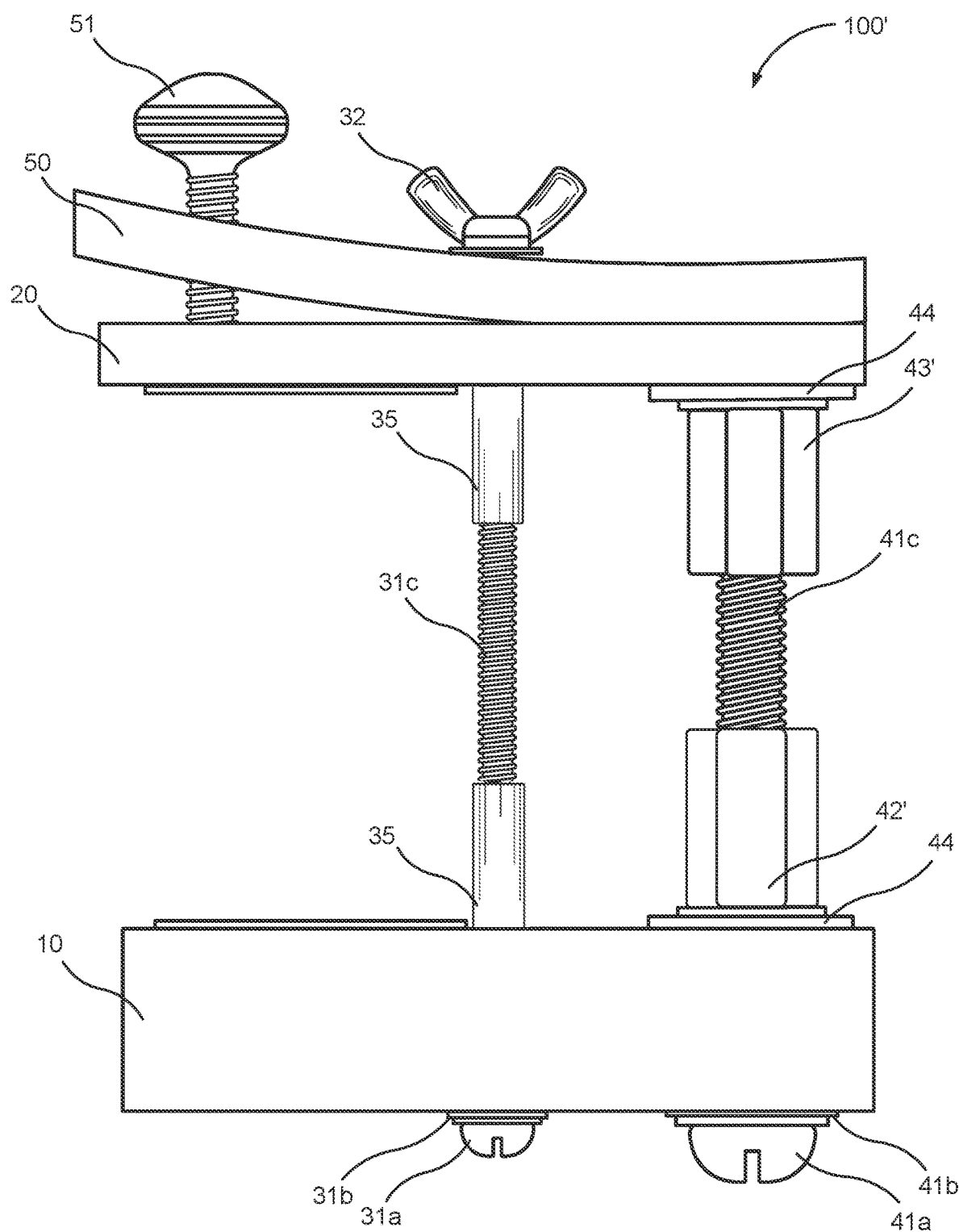
FIG. 5 shows an exploded view of the clamping device in accordance with some embodiments.

FIG. 5 illustrates another embodiment, clamping device 100' which is substantially the same as that of FIG. 3 except the fulcrum further includes protective sleeves 35 against jaws 10, 20 to provide protection for the object (e.g. shelf) being clamped from the threaded portion 31c the bolt 31. The protective sleeves can be made from plastic, metal or any suitable material. The protective sleeves can be threaded or include ridges along the interior to couple to the threaded portion. Additionally, in this embodiment, the fasteners of the leveraging mechanism can include elongated bolts 42', 43' along the threaded portion 41c of the bolt 41 to facilitate ease in tightening of the bolts by the user, for example by manual tightening or use of pliers or a tool.

Figure 6:
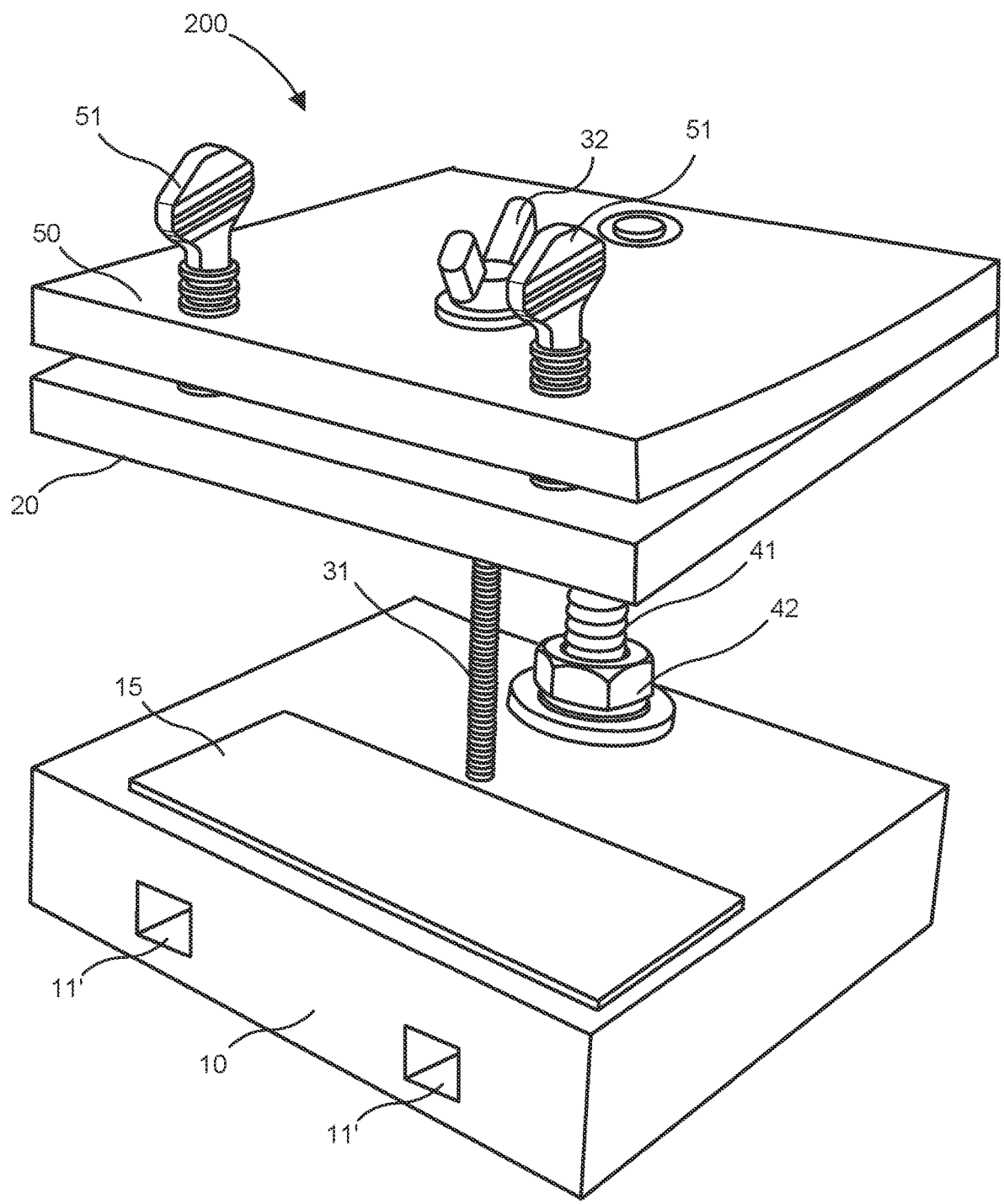
FIG. 6 shows an alternative design of a clamping device in accordance with some embodiments.

FIG. 6 illustrates another embodiment, clamping device 200, which is similar to the previous embodiments except the fulcrum and leveraging mechanism are each defined by a single shaft, bolt 31 and bolt 41, respectively. Additionally, the coupling mechanism is defined by two passages 11' spaced laterally apart within stationary jaw 10. Each opening is also non-circular, namely a square cross-section. Each of these attributes can be advantageous in avoiding inadvertent rotation of an accessory support shaft inserted into the passage. It is appreciated that either of these aspects (e.g. multiple openings, non-circular cross-section) could be used in any of the embodiments of the clamping device described herein. In some embodiments, a single accessory support could be used with multiple openings in the clamping device. In other embodiments, the multiple coupling features could couple with multiple accessory support shafts. It is further appreciated that the coupling feature could be disposed in differing alignments, for example extending in a lengthwise direction from a side of the clamping device, extending in a vertical direction, at any angle or any desired orientation. Further, the coupling mechanism could be a protrusion configured to couple with a receptacle of the accessory support. It is appreciated that some embodiments could include multiple features or passages (e.g. two or more), which could extend from the same face of the jaw or differing faces, could extend in parallel or differing orientations or directions to allow a range of coupling positions and/or orientations while the clamp remains clamped in a single position. In some embodiments, the coupling feature includes a male stud, typically made of metal, (e.g. baby pin), which could be molded as an integral part of the stationary jaw or a separate component attached by other means (e.g. welded). A male stud coupling feature may be particularly useful for coupling with motion picture equipment.

Figure 7:
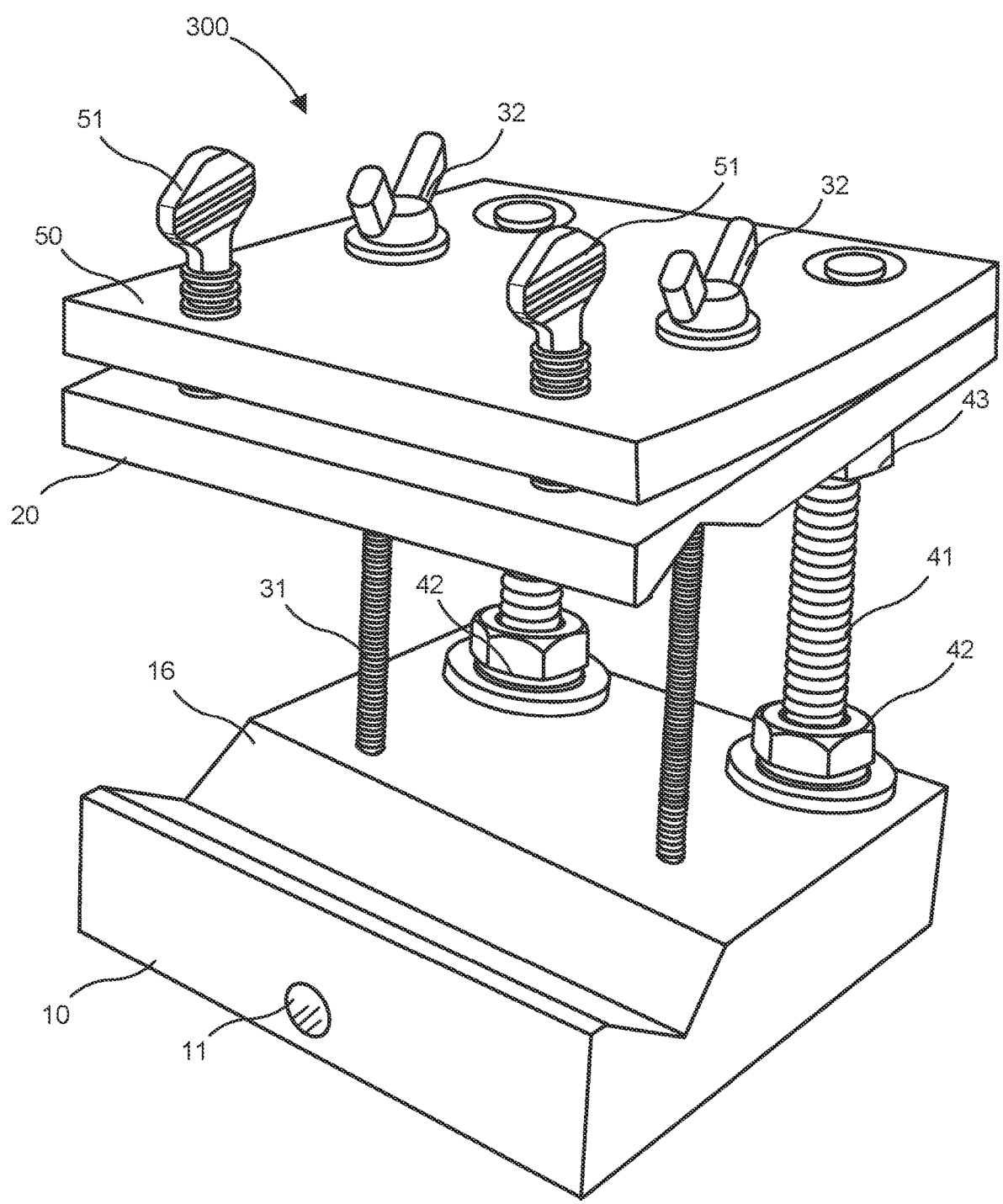
FIGS. 7-8 show another alternative design of a clamping device in accordance with some embodiments.
Figure 8:
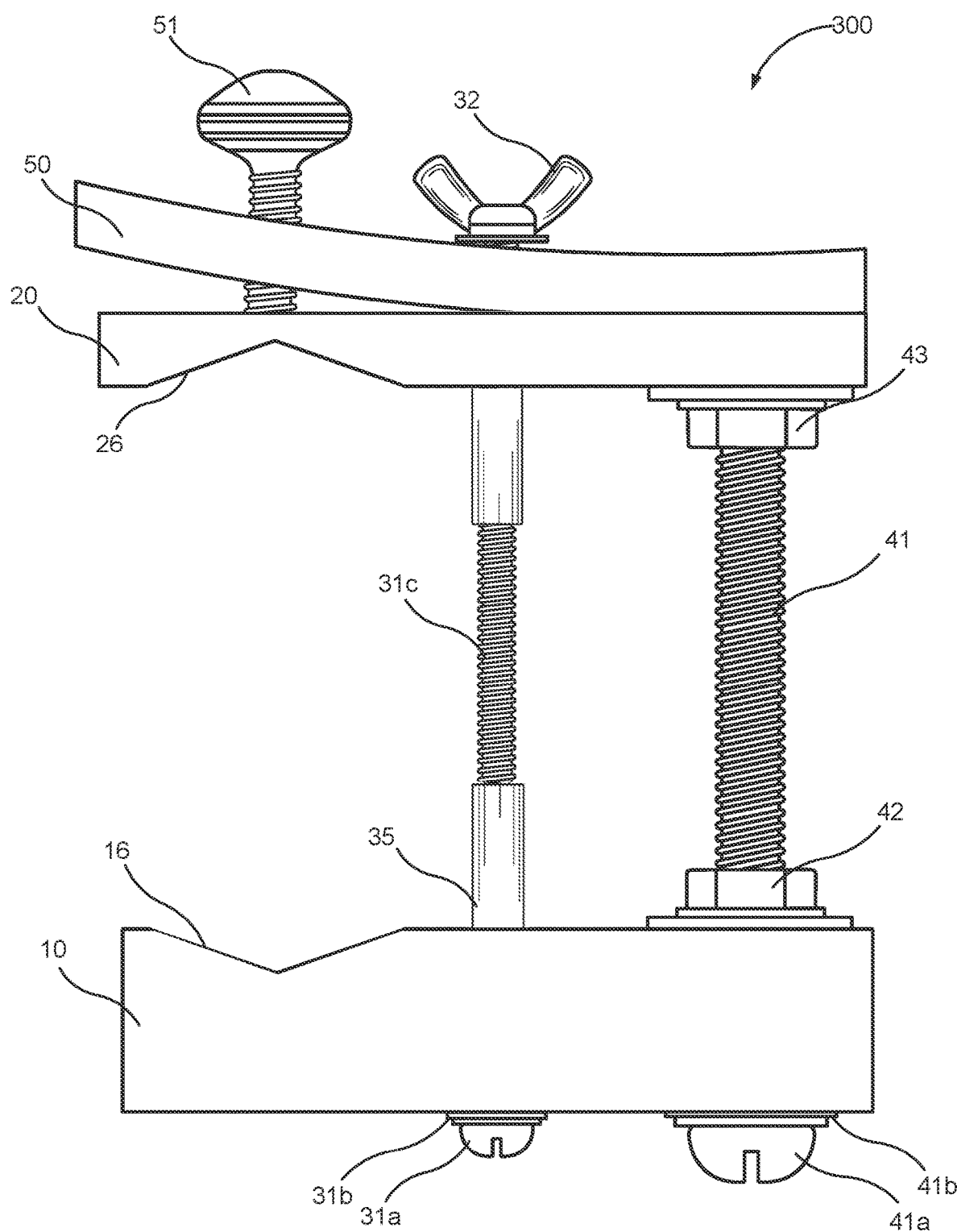

FIGS. 7-8 illustrates another embodiment, clamping device 300, which is similar to the embodiment in FIGS. 1-3 except the jaws 10, 20 have a non-planar contact surface for clamping onto a non-planar object, such as a pipe of a stand or a scaffold, which are frequently used in the motion picture industry. Each jaw includes a contour that is shaped to facilitate clamping onto a non-planar object, the stationary jaw including contour 16 and the slidable jaw 20 includes a corresponding contour 26. In this embodiment, the contour 16 is an inwardly angled V-shaped notch or recess to facilitate clamping onto a cylindrical object, such as a pipe. While a V-shaped recess is shown here, it is appreciated that the contour could be formed in any suitable size or shape as needed for a particular application. In another embodiment, the clamping device could be a hybrid between the embodiments of FIGS. 1 and 7, having one planar jaw and one jaw with an inside contour, such as a V-shape. In some embodiments, the V-shaped notch or recess and/or the flat planar portions outside of the V-shaped notch or recess can include a protecting pad layer (such as that shown in FIG. 3). It is appreciated that the protective pad layer can be included on any shape of jaws to protect the surface of the object being clamped.

Figure 9:
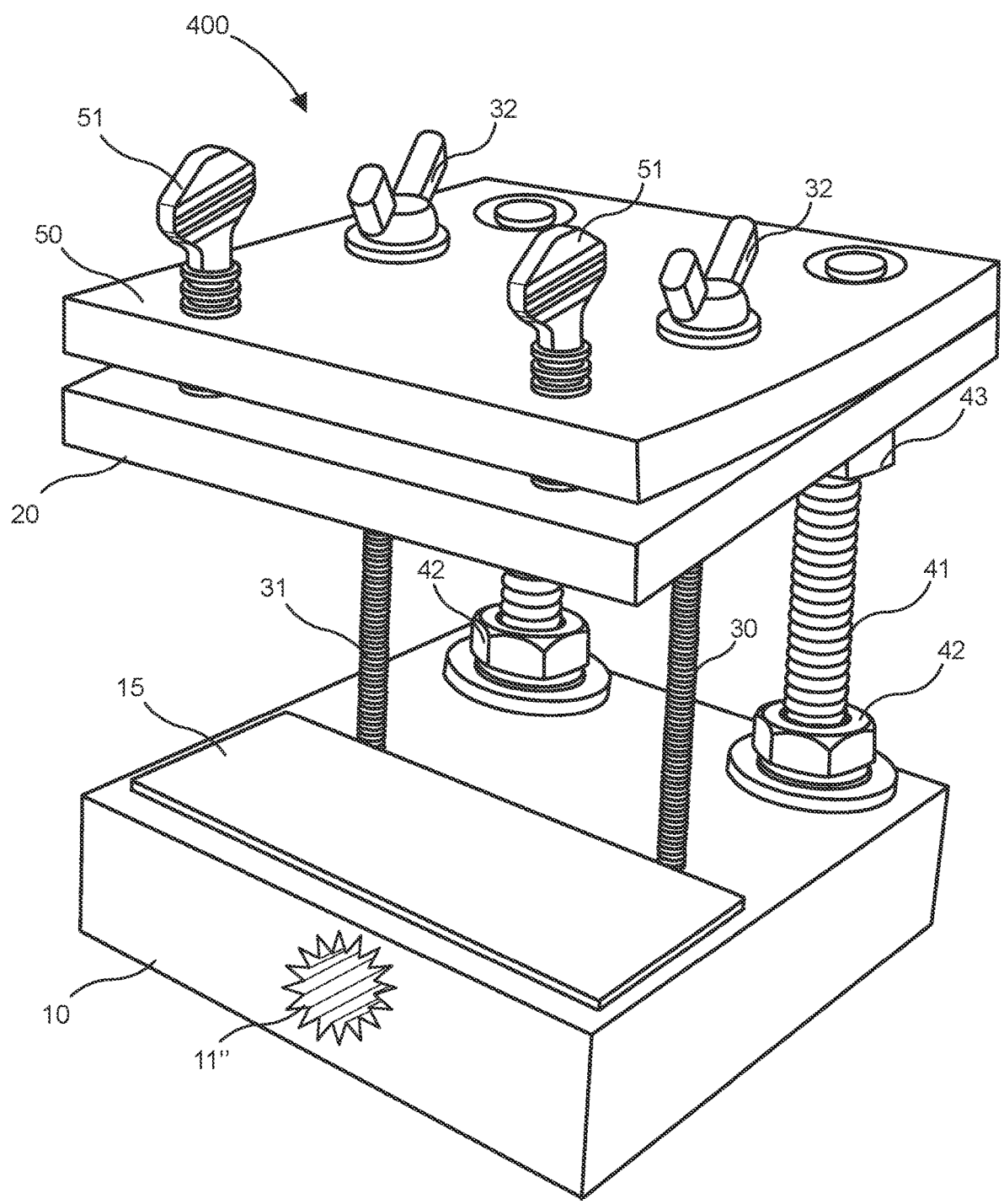
FIG. 9 shows another alternative design of a clamping device in accordance with some embodiments.

FIG. 9 illustrates another embodiment, clamping device 400, which is similar to the embodiment in FIGS. 1-3 except the coupling feature 11" has a unique star shape. Similar to the non-circular shape of the coupling feature in FIG. 6, this shape may better resist inadvertent rotation of a shaft insert into the coupling feature. Additionally, this design may significantly increase contact forces therein such that a separate lock or latch may not be required. While a particular shape is shown here, it is appreciated that the coupling feature could be any shape desired, or could include multiple openings.

Figure 10:
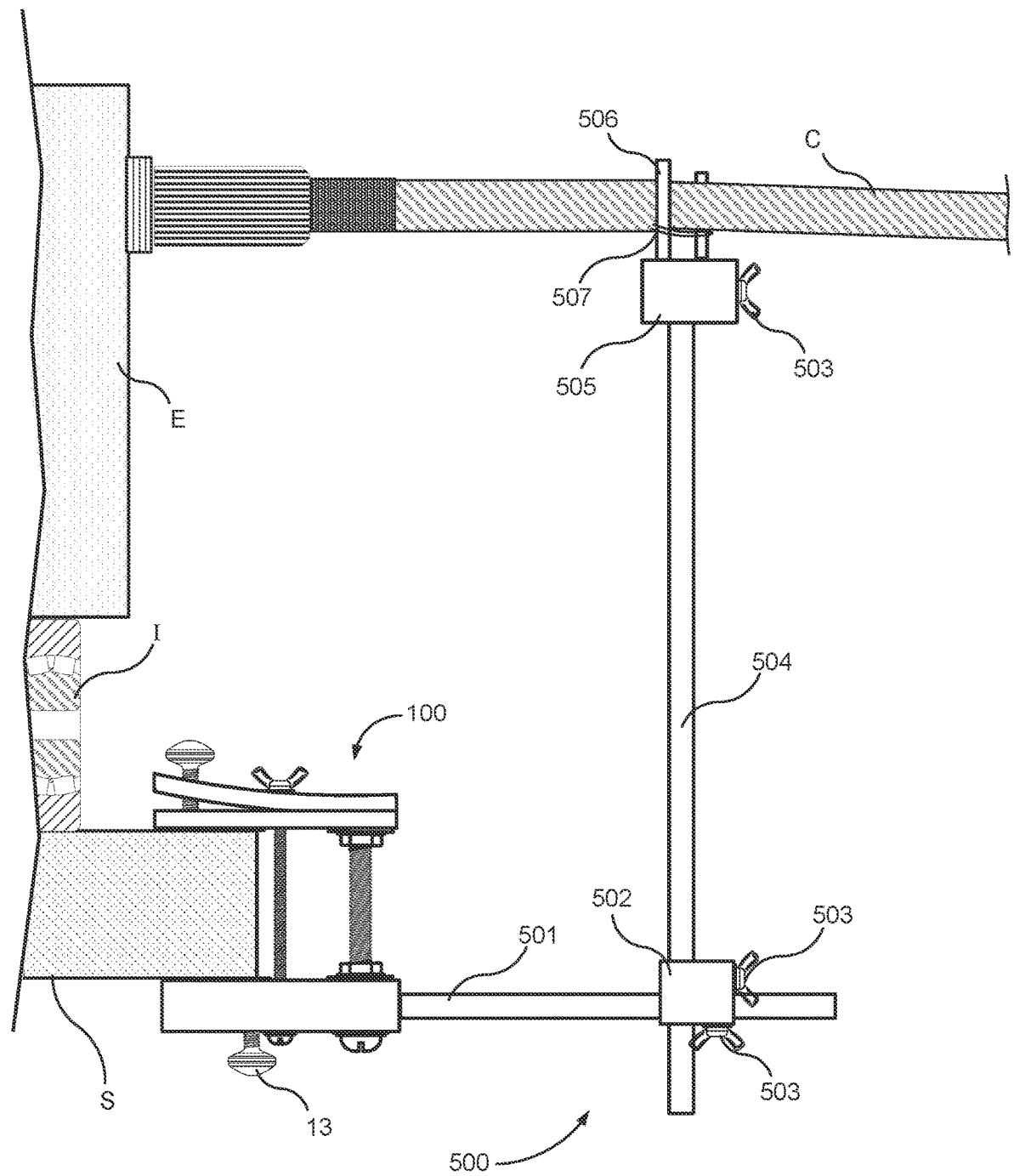
FIG. 10 shows an audio setup that utilizes a clamping device, in accordance with some embodiments, that supports a cable connected to equipment on a shelf on which the clamping device is mounted.

FIG. 10 illustrates an audio system setup utilizing clamping device 100 mounted to a shelf S and attached to an accessory support 500 that supports a high-end audio cable C. The audio cable C is attached to audio equipment E, which sits atop a vibration isolator I (e.g. springs, ball-bearings), which rests on the shelf S. By this approach, the clamping device ensures the weight of the cable is supported to avoid inadvertent dislodging of the cable from the equipment, avoid the weight of the cable from pulling on the equipment and limiting movement of the equipment, and avoid transmitting vibrations from the cable to the equipment. Accordingly, the clamping device and accessory support allow the vibration isolator I to function more effectively, thereby improving performance of the equipment. The clamp device and support further allow the position of the cable to be maintained, thereby allowing for improved cable management to avoid the effects of electrical artifacts.

In this embodiment, the clamping device 100 is clamped onto shelf S, with the fulcrum, leveraging mechanism, and resistance plate of the clamp providing improved clamping as described above. A shaft 501 of an accessory support is inserted into the coupling feature of the stationary jaw and secured into place by male fastener 13 screwed into the lock hole on the underside of the stationary jaw 10. Accessory support 500 can include multiple shafts and junction blocks that can be assembled in various arrangements and positioned to support a given component in an existing setup. In this setup, the other end of shaft 501 has been inserted into a junction block 502 and secured by fastener 503, another shaft 504 has been inserted into the junction block 502 to extend vertically and is secured by another fastener 503. An accessory support block 505 is secured to the other end of rod 504 with another fastener 503 directly beneath the audio cable to be supported. In this embodiment, the accessory support block 505 includes a pair of prongs 506 that support a sling 507 that supports the cable. The sling can be made of rubber, textile or any suitable material so as to absorb vibrations, thereby avoiding transmission of vibrations from the accessory support to the cable and allow for minor movements of the cable. While a particular accessory support setup is detailed here, it is appreciated that the accessory support could be realized in various ways, utilizing any number of specially designed supports or existing supports for supporting cables or equipment, including audio or video cables, as well as video or lighting equipment.

It is appreciated that the clamping device can be scaled to any suitable size and shape for the requirements of a given application. In some embodiments, the clamping device is relatively small, having largest dimension of less than 6 inches, suitable for mounting on shelves or supports of a couple inches or less and supporting cables or equipment of modest size or weight (e.g. 15 lbs, 10 lbs, or 5 lbs or less). In other embodiments, the clamping device could be larger and configured for supporting considerably larger, heavier cables or equipment. For example, the clamping device could have greater dimensions of more than 6 inches so as to provide still greater clamping forces to support cables or equipment of greater size or weight (e.g. 10 lbs, 20 lbs, 50 lbs, 100 lbs or more). In some embodiments, the clamping device can of a considerably larger scale and suited for industrial purposes (e.g. manufacturing, shipping, utilities, mining, etc.)

It is further appreciated that while the basic features of the invention are described herein, the clamping device may include additional features or components not described, yet still remain within the scope and spirit of the invention described herein. Further, the inventive concepts set forth above are not limited to the specific components detailed above and could include various alternative designs and components that serve the same function. For example, a clamping device in accordance with the invention can include any of the features in the various embodiments described above or depicted in the figures in any combination, or can include various alternative components or additional features.

While the above is a complete description of specific embodiments of the invention, the above description should not be taken as limiting the scope of the invention as defined by the claims. Various features, embodiments and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A clamping device comprising:
    a pair of jaws that are spaced apart and movable relative each other so as to clamp onto an object disposed between inner ends of the pair of jaws;
    a fulcrum extending between the pair of jaws along a mid-portion thereof;
    a leveraging mechanism extending between the pair of jaws between the mid-portion and an outer end of the jaws away from the object when clamped so as to apply a leveraging force to one jaw of the pair of jaws to increase clamping force at the inner end of the jaws via the fulcrum; and
    a resistance plate disposed atop the one jaw of the pair of jaws that is adjustable so as to increase a clamping force along the inner end of the jaws when clamped.

2. The clamping device of claim 1, wherein the pair of jaws comprises:
    a stationary jaw; and
    a slidable jaw that can slide relative the stationary jaw to accommodate objects of differing size and thickness.

3. The clamping device of claim 1, wherein the fulcrum comprises one or more shafts extending through corresponding holes in each of the pair of jaws.

4. The clamping device of claim 3, wherein the fulcrum comprises at least a pair of shafts extending through a pair of corresponding holes in each of the pair of jaws.

5. The clamping device of claim 3, wherein each of the shafts of the fulcrum includes a fastener engaged along an exterior of one of the pair of jaws.

6. The clamping device of claim 5, wherein each of the shafts of the fulcrum is a threaded bolt and the fastener is a female fastener.

7. The clamping device of claim 6, wherein the female fastener comprises a wingnut.

8. The clamping device of claim 1, wherein the leveraging mechanism comprises one or more shafts extending through corresponding holes in each of the pair of jaws.

9. The clamping device of claim 8, wherein the leveraging mechanism comprises at least a pair of shafts extending through a pair of corresponding holes in each of the pair of jaws.

10. The clamping device of claim 8, wherein each of the shafts of the leveraging mechanism includes a pair of fasteners engaged along an interior of the pair of jaws so that adjustment of the fasteners in opposed directions applies a force to the one jaw to leverage the one jaw to pivot at the fulcrum thereby increasing the clamping force at the inner end of the jaws.

11. The clamping device of claim 10, wherein each of the shafts include a threaded bolt and the pair of fasteners comprise female fasteners.

12. The clamping device of claim 11, wherein the female fasteners comprise nuts.

13. The clamping device of claim 1, wherein the resistance plate comprises an adjustment mechanism that, when adjusted, deflects the resistance plate at the inner end and applies a direct force on the one jaw that increases the clamping force.

14. The clamping device of claim 13, wherein the adjustment mechanism comprises one or more male fasteners that extends through a corresponding hole in the resistance plate and engages the one jaw of the pair of jaws when tightened.

15. The clamping device of claim 14, wherein the one or more male fasteners comprise one or more thumbscrew bolts.

16. The clamping device of claim 1, further comprising:
one or more support coupling features for releasably coupling an accessory support configured to support a cable and/or equipment.

17. The clamping device of claim 16, wherein the support coupling feature comprises one or more holes or passages extending through at least one jaw of the pair of jaws.

18. The clamping device of claim 17, wherein the one or more holes are circular.

19. The clamping device of claim 17, wherein the one or more holes are non-circular.

20. The clamping device of claim 17, wherein the support coupling features comprise at least a pair of holes disposed in the same jaw of the pair of jaws.

21. The clamping device of claim 16, wherein the supporting coupling feature comprise one or more protrusion extending from at least one jaw of the pair of jaws.

22. The clamping device of claim 21, wherein the one or more protrusion comprises a male stud formed of metal.

23. The clamping device of claim 22, wherein the male stud comprises a baby pin.

24. A clamping device comprising:
a pair of jaws that are spaced apart so as to clamp onto an object disposed between an inner end of the pair of jaws disposed along the object when clamped;
a fulcrum extending between the pair of jaws along a mid-portion thereof, wherein the fulcrum comprises one or more shafts extending through corresponding holes in each of the pair of jaws, wherein each of the shafts of the fulcrum comprises a threaded bolt and an adjustable fastener engaged along an exterior of one of the pair of jaws; and
a leveraging mechanism extending between the pair of jaws between the mid-portion and an outer end of the jaws spaced away from the object when clamped, wherein the leveraging mechanism comprises one or more shafts extending through corresponding holes in each of the pair of jaws, wherein each of the shafts comprises a threaded bolt and the leveraging mechanism further include a pair of fasteners on each respective shaft that are engaged along an interior of the pair of jaws so that adjustment of the fasteners in opposed directions leverage the pair of jaws at the outer facing sides to pivot the jaws along the fulcrum and increase the clamping force at the inner end.

25. The clamping device of claim 24, further comprising:
an adjustable resistance plate disposed atop one jaw of the pair of jaws that is adjustable so as to increase a force of engagement of the one jaw along the inner end disposed along the object when clamped so as to withstand vibrations and maintain clamping force along the inner end of the clamping device.

26. The clamping device of claim 24, wherein the clamping device is configured to support motion picture or television production equipment.

27. The clamping device of claim 24, wherein the clamping device is configured to support audio or visual cables.

28. The clamping device of claim 24 further comprising:
one or more support coupling features for releasably coupling an accessory support configured to support a cable and/or equipment.

29. The clamping device of claim 28, wherein the support coupling feature comprises one or more holes or passages extending through at least one jaw of the pair of jaws.

30. The clamping device of claim 28, wherein the support coupling feature comprises one or more male studs extending from at least one jaw of the pair of jaws.

* * * * *